No. 812,056. PATENTED FEB. 6, 1906.
C. H. LITTLE.
PLOW.
APPLICATION FILED AUG. 11, 1905.
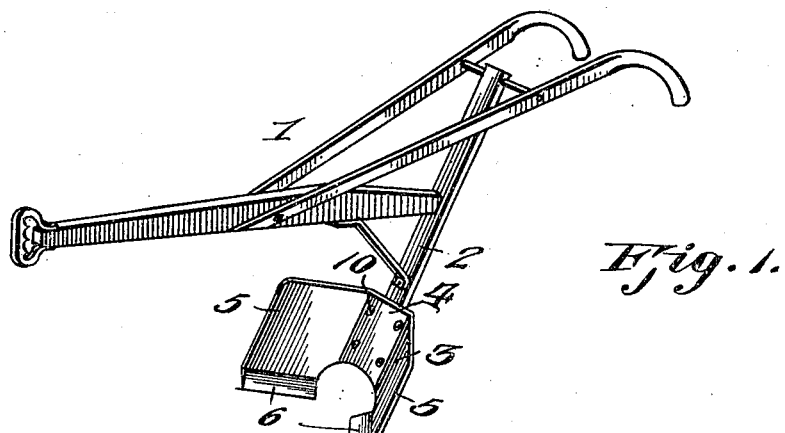
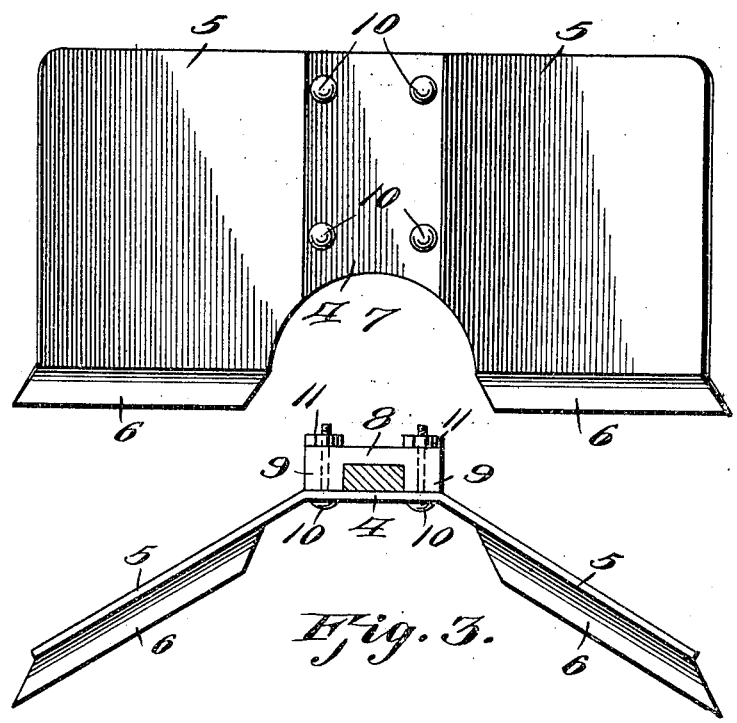
Witnesses
Frank B. Hoffman
Inventor
Charles H. Little
By Victor J. Evans.
Attorney

UNITED STATES PATENT OFFICE.

CHARLES H. LITTLE, OF CHICAGO, ILLINOIS.

PLOW.

No. 812,056.     Specification of Letters Patent.     Patented Feb. 6, 1906.

Application filed August 11, 1905. Serial No. 273,830.

*To all whom it may concern:*

Be it known that I, CHARLES H. LITTLE, a citizen of the United States, residing at Chicago, in the county of Cook and State of Illinois, have invented new and useful Improvements in Plows, of which the following is a specification.

This invention relates to plows of the shovel type, and has for its objects to provide a comparatively simple and inexpensive device of this character designed especially for covering potatoes and various kinds of seeds and one wherein the shovel may be readily attached to or disconnected from the plow-standard.

To these ends the invention comprises the novel features of construction and combination of parts more fully hereinafter described.

In the accompanying drawings, Figure 1 is a perspective view of a plow equipped with a shovel embodying the invention. Fig. 2 is a front elevation of the shovel. Fig. 3 is a top plan view of the same, the plow-standard being shown in section.

Referring to the drawings, 1 designates a plow of the usual or any appropriate construction having a standard 2, to the lower end of which is attached a shovel 3. The shovel 3, which in accordance with the present invention is formed from a single piece of material, comprises a central flattened body portion 4 and a pair of forwardly-inclined angularly-disposed wings or blades 5, having at their lower edges downwardly and inwardly inclined sharpened cutting portions or knives 6, there being formed between the blades and at the point of junction thereof with the body portion 4 a vertical opening or recess 7 of substantially semicircular form in elevation, adapting the blades to straddle and work upon opposite sides of a furrow.

For attaching the shovel 3 to the standard 2 I preferably employ a recessed clamping member or block 8, having side portions 9, disposed relatively at the opposite side edges of the standard 2, and clamping members or bolts 10, extended through the body portion 4 of the blades and said side portions 9 of the block, there being tapped on the ends of the bolts to bear upon the rear face of the block clamping-nuts 11.

In practice as the plow travels over the ground with the recess 7 in line with a furrow the blades 5 work upon opposite sides of the latter, and their cutting edges or knives 6 serve to turn the soil inwardly over the seed.

From the foregoing it is apparent that I produce a simple device which in practice will efficiently perform its functions to the attainment of the ends in view and one which may be readily attached to or removed from the standard, it being understood that in attaining these ends minor changes in the details herein set forth may be resorted to without departing from the spirit or scope of the invention.

Having thus described the invention, what is claimed as new is—

1. A plow-shovel comprising a body portion, and a pair of upright outwardly-disposed blades provided with sharpened and inwardly-turned lower cutting edges.

2. A plow-shovel comprising a body portion and forwardly-projecting angularly-disposed blades having at their lower edges inwardly-turned sharpened cutting portions.

3. A plow-shovel comprising a body portion and angularly-disposed blades having at their lower edges inwardly-turned sharpened cutting portions and a vertical recess formed between the blades.

4. A plow-shovel formed in a single piece and comprising a central body portion, and oppositely-disposed forwardly-extending blades provided at their lower edges with inwardly-turned sharpened cutting portions.

In testimony whereof I affix my signature in presence of two witnesses.

CHARLES H. LITTLE.

Witnesses:
   ELIZA J. KEATING,
   MONROE CREGOR.